(12) United States Patent
Sakurai et al.

(10) Patent No.: US 6,265,696 B1
(45) Date of Patent: Jul. 24, 2001

(54) HEAT TREATMENT METHOD AND A HEAT TREATMENT APPARATUS FOR CONTROLLING THE TEMPERATURE OF A SUBSTRATE SURFACE

(75) Inventors: Hideaki Sakurai, Yokohama; Akitoshi Kumagae, Ichikawa; Iwao Higashikawa, Tokyo; Shinichi Ito, Yokohama; Tsunetoshi Arikado, Tokyo; Katsuya Okumura, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/371,845

(22) Filed: Aug. 11, 1999

(30) Foreign Application Priority Data

Aug. 12, 1998 (JP) .................................... 10-228135

(51) Int. Cl.[7] ...................................... F27B 5/14
(52) U.S. Cl. .................... 219/390; 219/494; 219/405; 250/497.2; 374/123; 118/724
(58) Field of Search .................... 219/390, 405, 219/411, 413, 494, 502; 250/497.2; 392/416, 418; 118/724, 725, 50.1; 374/123, 126, 128, 129

(56) References Cited

U.S. PATENT DOCUMENTS

| | | | |
|---|---|---|---|
| 4,890,245 | 12/1989 | Yomoto et al. . | |
| 5,066,514 | * 11/1991 | Oyoshi | 427/38 |
| 5,262,257 | * 11/1993 | Fukuda et al. | 430/5 |
| 5,377,126 | * 12/1994 | Flik et al. | 364/557 |
| 5,727,017 | * 3/1998 | Maurer et al. | 374/9 |
| 5,834,737 | * 11/1998 | Hirose et al. | 219/385 |

FOREIGN PATENT DOCUMENTS 5-299428    11/1993  (JP) .

* cited by examiner

Primary Examiner—Teresa Walberg
Assistant Examiner—Shawntina Fuqua
(74) Attorney, Agent, or Firm—Finnegan, Henderson, Farabow, Garrett, & Dunner L.L.P.

(57) ABSTRACT

A substrate to be processed on which a thin film is formed is supported by a support member. The substrate to be processed is heated by a heating section. The surface temperature is measured by a radiation thermometer, and the heating temperature of the heating section is controlled by a control section, in response to the temperature measured by the radiation thermometer. Further, a blackbody is provided at a position optically symmetrical to the radiation thermometer with respect to the surface of the thin film. The blackbody is set at a constant temperature. The blackbody cuts stray light (noise light) which enters into the radiation thermometer.

9 Claims, 7 Drawing Sheets

HEAT TREATMENT METHOD AND A HEAT TREATMENT APPARATUS FOR CONTROLLING THE TEMPERATURE OF A SUBSTRATE SURFACE

BACKGROUND OF THE INVENTION

The present invention relates to a heat treatment technique used in the field of semiconductor devices and particularly to a heat treatment method and a heat treatment apparatus for controlling the temperature of a substrate surface.

In recent years, as high integration of semiconductor devices has progressed, patterns have been miniaturized and preciseness thereof has been improved. In steps of manufacturing a photomask used for pattern exposure, a means for subjecting a photosensitive material to a heat treatment is necessary for the step of forming a pattern. In the process including the step of heating or cooling substrates to be exposed, variants of the treatment temperature are reflected on variants of the pattern size. Therefore, more precise management of the temperature has been demanded in accordance with miniaturization and improvement of the preciseness.

Conventionally, a thermocouple or a resistance bulb is embedded near the surface of a heating plate used for a heating treatment to measure the temperature, when managing the temperature of a substrate. Further, the output of a heating mechanism is controlled based on the obtained temperature, and a heat treatment is performed. However, since quartz forming the under layer of the substrate to be exposed has a very low thermal diffusivity, temperature of the photosensitive material film on the surface of the substrate to be processed cannot be accurately controlled by the method described above.

To perform precise temperature control with user of a quartz substrate used for a substrate to be exposed, it is necessary to measure directly the temperature of the film as a target to be subjected to a heat treatment on the substrate. Means for measuring the surface temperature are roughly divided into two types, one being a contact type and the other being a non-contact type, depending on the characteristics of a monitoring method.

As the contact type, there is a method of measuring the surface temperature by embedding a thermocouple into a film as a target on the substrate. However, it is not a realistic way to embed thermocouples into all substrates to be processed. Also, a photomask manufactured and processed by embedding directly a thermocouple in the substrate to be processed is not suitable for practical use. By attaching a thermocouple or a resistance member, the temperature characteristic is changed. Therefore, there is a problem that the photosensitive material film as a target to be heated cannot be accurately measured. In particular, it is impossible to embed a temperature sensor into a photosensitive material film having a film thickness of about 0.1 to 2 $\mu$m called a resist.

From the reasons described above, it is preferable to use the temperature measuring method of the non-contact type. A radiation thermometer is a representative example of the temperature measuring device of this type. There is an example using the radiation thermometer which has succeeded in measurement of a surface temperature of a steel material having a precise oxide film processed by a shape steel line or the like.

However, the temperature measurement of a substrate to be processed or the like with use of the radiation thermometer involves the following problems. In this measurement, since the temperature of the temperature measurement area is as low as about 50 to 200° C., the signal is weak. Therefore, if other radiated light than that from the target to be measured enters into the sensor section, a measurement error is caused. In addition, it is not possible to neglect a measurement error due to drifting of the sensitivity which is considered as depending on the environmental temperature and the like. From the reasons described above, the radiation thermometer involves a problem that accurate temperature measurement is difficult.

In addition, to obtain more precise patterns, it is highly necessary to use a step of measuring the temperature of the substrate surface with high preciseness and of performing heating (or cooling) based on the measurement result. Therefore, demands for a method and an apparatus, by which temperature measurement is carried out while monitoring the surface temperature of a substrate (in-situ) and feedback is immediately reflected on a heat control section or the like, have become more and more serious.

BRIEF SUMMARY OF THE INVENTION

The present invention has been made in view of the above-described situation, and has an object of providing a heat treatment method and a heat treatment apparatus, by which the surface temperature of a substrate to be processed such as a substrate for exposure can be measured with high preciseness so that accurate temperature management of a thin film formed on the substrate can be achieved.

To achieve the above object, the present invention according to a first aspect thereof has the structure as follows. A heat treatment method is characterized by comprising steps of: measuring a temperature of a thin film formed on a substrate to be processed, by a radiation thermometer which performs measurement with use of a wavelength range except for a wavelength range of light which is transmitted through the thin film; and controlling a heated temperature of the thin film in response to the temperature measured by the step.

Also, to achieve the above object, the present invention according to the second aspect thereof has the structure as follows. A heat treatment apparatus is characterized by comprising: a support member for supporting a substrate to be processed, on which a thin film is formed; a heating section for heating the thin film; a radiation thermometer for measuring a surface temperature of the thin film; and a control section for controlling a temperature which is heated by the heating section, in response to the temperature measured by the radiation thermometer.

Also, to achieve the above object, the present invention according to a third aspect thereof further comprises, before the step of measuring the temperature of the thin film, steps of: measuring a surface temperature of a reference sample which is made of same material as the substrate and is set at a target temperature, by the radiation thermometer; and correcting a measurement value of the radiation thermometer, based on temperature data obtained by the step of measuring the temperature of the reference sample.

Also, to achieve to the above object, the present invention according to a fourth aspect thereof has a structure as follows. The heat treatment apparatus described above further comprises: a reference sample which is made of same material as the substrate and is set at a target temperature; and a correcting section for measuring a surface temperature of the reference sample, and for correcting a measurement value of the radiation thermometer, based on temperature data obtained by measurement of the surface temperature of the reference sample.

Preferred embodiments of the present invention will be as follows, for example.

(1) The substrate to be processed is a photomask blank in which a thin film containing metal made of chrome (Cr) or the like is formed on a transparent substrate made of quartz or the like, and a photosensitive thin film made of a chemical amplification type resist or the like is formed thereon.

(2) There is provided a blackbody for cutting stray light which enters into the radiation thermometer through the surface of the substrate.

(3) The blackbody is provided at a position optically symmetrical to the radiation thermometer with respect to a surface of the thin film, and the blackbody is set at a predetermined temperature.

(4) The radiation thermometer is an infrared sensor.

(5) The radiation thermometer makes measurement with use of light of a wavelength range except for light of a wavelength range which is radiated to the radiation thermometer from the substrate.

(6) The wavelength range of the light measured by the radiation thermometer is set to either a range of 2.7 to 2.8 $\mu$m or a range from 4.3 $\mu$m. Furthermore, the wavelength range of the light is desirably set to $\mu$m or more.

(7) The heating section is a halogen lamp or a hot plate. The heating section is provided in a side of a surface of the substrate which is opposite to another surface of the substrate where the thin film is formed, and applies energy to the substrate to be processed.

(8) A straightening plate, which controls the flow of a gas above the substrate and transmits the light of the wavelength range whose temperature is monitored, is provided above the substrate to be processed. The straightening plate is movable in the vertical direction, the lateral direction, and the height direction.

(9) The straightening plate exists on a light passage between the blackbody and the radiation thermometer and has a plurality of holes in the direction along the light passage.

(10) To approximate the temperature of the photosensitive thin film to a previously aimed temperature, an energy value required for heating or cooling is calculated from the measured temperature, and the energy value thus obtained is transmitted as a power for the heating or cooling means.

(11) When the processing amount calculated from the measured temperature and the heating processing time reaches a preset value, heating is stopped.

(12) After the energy for heating the substrate during measurement is shut off, the temperature is measured with use of the radiation thermometer. Correction of adding an offset or the like is made to the obtained temperature data, thereby to calculate the temperature.

(13) Modulation with a lower frequency than the response speed of the temperature measurement system is effected on the energy for heating the substrate to be processed.

(14) The reference sample is a sample in which a thin film having a radiation rate substantially equal to the photosensitive thin film with respect to the measurement wavelength of the radiation thermometer is formed on a substrate having the same material as the substrate to be processed.

(15) The reference sample has the completely same structure as the substrate to be processed.

(16) A resistance bulb or a thermocouple is embedded near the surface of the reference sample.

(17) The surface temperature of the reference sample is measured by the radiation thermometer or a resistance bulb, or a thermocouple, and there is provided a correcting section for correcting the measurement value of the radiation thermometer, based on the temperature data obtained by this measurement.

According to the structure described above, the present invention provides the following functions and advantages. The following result will be obtained in the case where a mask blank in which a thin film containing metal of chrome or the like is formed on a transparent substrate of quartz or the like and a photosensitive thin film having a thickness of about 500 nm is further formed thereon is used as a substrate to be processed on which a photosensitive thin film (photo resist film) is formed. The infrared transmittance of the mask blank is substantially zero within a range of 2.7 to 2.8 $\mu$m and within a range of 4.3 $\mu$m or more. This is because the thin film containing metal existing on the mask blank substantially shields most of the light of this wavelength range. Therefore, by setting the measurement wavelength of the radiation thermometer within a range of 2.7 to 2.8 $\mu$m or a range of 4.3 $\mu$m or more, the radiation thermometer does not detect radiation light from a heating source existing in the side opposite to the thin film containing metal with respect to the substrate. Accordingly, the surface temperature (temperature of the photo resist film) of the substrate to be processed can be measured with high preciseness by the radiation thermometer.

Here, the photo resist film existing on the photomask blank has very high flatness on the resist surface and therefore has a mirror characteristic. Therefore, there is provided a mechanism (which is a blackbody having a constant temperature) for removing stray light in the direction including a position of a mirror image symmetrical to the radiation thermometer with respect to the temperature measurement position as a reference position. The radiation thermometer therefore receives two radiation lights, i.e., radiation light from the surface (the photosensitive thin film and the thin film containing metal) of the substrate to be processed and radiation light which comes from the black body and is reflected on the surface of the substrate. By previously measuring radiation rates of the black body and the photosensitive thin film on the substrate to be processed, it is possible to know the radiation amount which enters into the radiation thermometer from the black body. Therefore, as for the radiation from the surface of the substrate, mixture of stray light can be efficiently prevented if the radiation amount which comes from the black body and is reflected on the surface of the substrate is subtracted from the radiation amount which is actually received by the radiation thermometer. As a result of this, the temperature of the photosensitive thin film can be measured with high preciseness by using the radiation thermometer.

Also, the measurement sensitivity of the radiation thermometer changes depending on service conditions such as the environmental temperature or the like. Before processing the substrate, the radiation thermometer used for measurement is used to measure the temperature of a reference sample, and correction is made to the measurement value of the radiation thermometer. Temperature measurement is thereafter carried out. Measurement errors among respective substrates to be processed can be thereby eliminated substantially. As a result of this, dimension controllability during PEB (Post Exposure Baking) is remarkably improved, and dimension errors among substrates to be processed can be reduced to be extremely small.

Also, if radiation based on lamp heating or the like is used as a heating means, the photo resist film can be heated without heating the quartz substrate as an under layer, within a particular wavelength range. In this manner, the processing time can be shortened. At this time, with respect to the mask blank on which a photosensitive material film is formed, the temperature measurement wavelength and the wavelength used for heating can be set to wavelengths different from each other, so that radiation required for heating does not become temperature measurement noise. Further, since a short processing time is enough, it is possible to reduce greatly occurrence of a heat distribution of the quartz substrate, and the uniformity in the plane of the substrate can be improved.

In addition, since heating is stopped when the processing amount calculated from the measured temperature and the heating processing time reaches a preset value, the total energy amount supplied to the substrate to be processed can be controlled strictly within the mask plane or between samples, so that controlability of absolute dimensions can be improved.

Also, in case where a radiation section is provided above the substrate to be processed with use of a lamp (radiation) as a heating means, it is considered that radiation noise may enter into the radiation thermometer. In this case, temperature measurement is carried out when the energy is OFF (or low), by shutting off the energy for heating the substrate or by modulating the energy with a lower frequency than the response speed of the temperature measurement system. In this manner, radiation noise can be greatly reduced by eliminating or reducing radiation caused due to heating only during temperature measurement. Accurate temperature measurement is enabled by making correction by software, e.g., by adding an offset value to the obtained temperature data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, details of the present invention will be explained with reference to the embodiment shown in the drawings. Experimental manufacture of a substrate to be exposed (photomask) used in a step of manufacturing a semiconductor device will be explained as an example.

[First Embodiment]

Figure 1A:
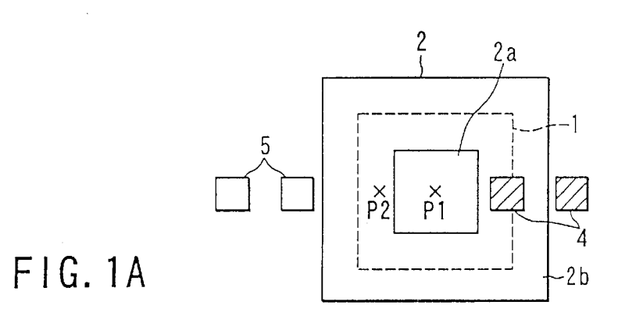
FIG. 1A is a plan view showing a part of the structure of a heat treatment apparatus according to the first embodiment of the present invention.
Figure 1B:
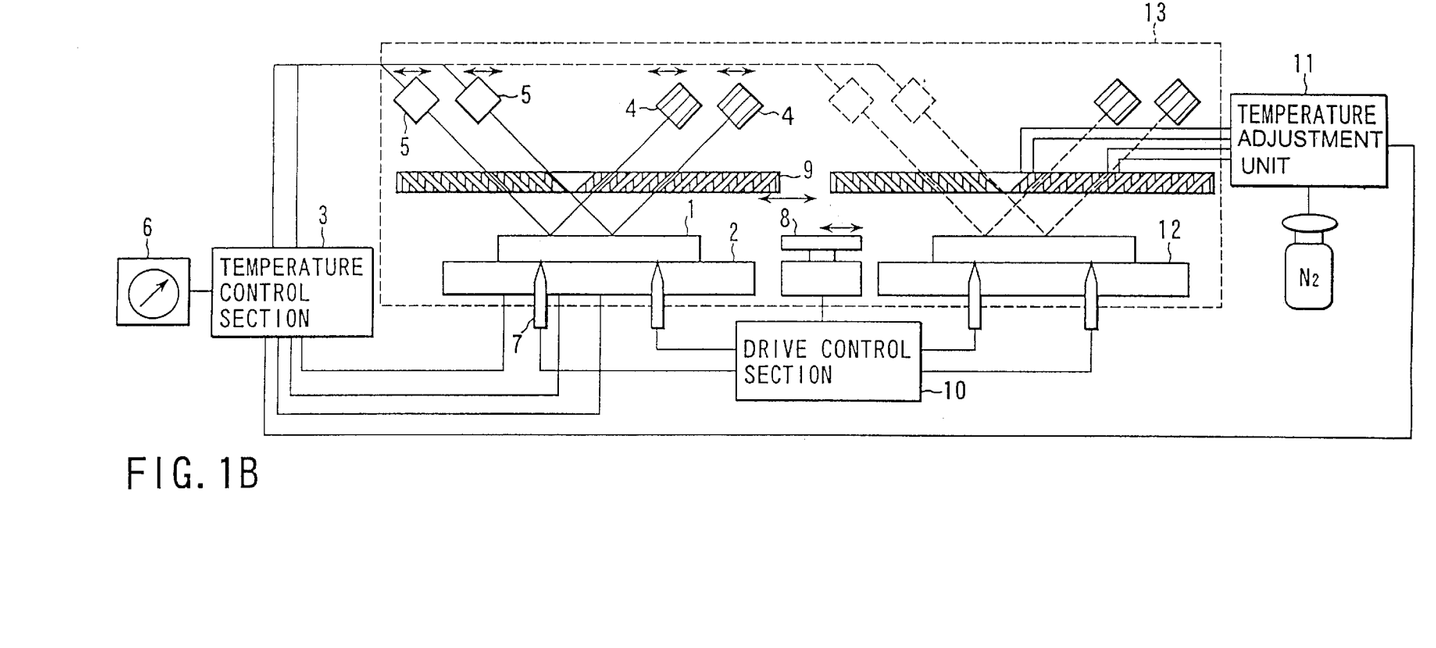
FIG. 1B is a side view showing the structure of the heat treatment apparatus.

FIG. 1A is a plan view schematically showing the structure of a heat treatment apparatus according to a first embodiment of the present invention. FIG. 1B is a side view showing the structure of the heat treatment apparatus. Note that FIG. 1A shows a part of the heat treatment apparatus.

As shown in FIG. 1B, this heat treatment apparatus is provided with a sample table 2, and a substrate 1 to be processed is set on the sample table 2. The substrate 1 to be processed is, for example, prepared by forming a photosensitive thin film such as a photo resist film on a chrome-mask blank of 6 inch size. The sample table 2 is divided into two parts having a function as a heater, as shown in FIG. 1A, e.g., a heater 2a at the center part and a heater 2b at the peripheral section. The heat temperatures of these heaters 2a and 2b thus divided are controlled by a temperature control section 3 such that the temperature of the photosensitive thin film on the substrate 1 to be processed becomes close to a set value. The heat temperatures (output) of the heaters 2a and 2b can be independently controlled by the temperature control section 3. Note that the temperature control section 3 feeds back the temperature data concerning the photosensitive thin film on the substrate 1 by a PID system, to determine the powers applied to the heaters 2a and 2b. Also, the temperature control section 3 has a function of calculating the energy amount from a substrate surface temperature and a heating period, and subsequently the reaction amount by PEB (Post Exposure Baking) of a chemical amplification type resist.

Above the substrate 1 to be processed, blackbodies 4 and radiation thermometers (infrared sensors) 5 are provided. Two blackbodies 4 and two radiation thermometers 5 are provided as shown in FIGS. 1A and 1B. The blackbodies 4 and the radiation thermometers 5 are provided with a movable stage (not shown) which can be adjusted in the directions of X, Y, Z, θ, and φ, and the measurement position can be freely selected.

The blackbodies 4 and the radiation thermometers 5 are provided at optically symmetric positions with respect to the surface of the substrate 1 to be processed, i.e., the blackbodies 4 and the radiation thermometers 5 are arranged to be mirror-symmetrical to each other in relation to a measurement position on the surface of the substrate 1 to be processed. Further, the heat radiated from the blackbodies is reflected by the substrate 1 to be processed and enters into the radiation thermometers 5. Also, the temperature measured by the radiation thermometer 5 is transmitted to the temperature control section 3 and is displayed on an indicator 6.

The following will be the method of arranging the blackbodies 4 and the radiation thermometers 5 in a mirror-symmetrical positional relationship with respect to the measurement position on the surface of the substrate 1 to be processed. A He—Ne laser and a photo-detector for alignment are attached to the folder or the like on which a blackbody 4 or a radiation thermometer 5 is fixed. Optical alignment is then carried out such that the measurement sensitivity is maximized at the position where the sensor output is maximized. Further, mirrors may be respectively provided to be adjacent to the laser and the photo-detector such that alignment light passes through the same light passage as the light passage for temperature measurement.

The chrome mask blank as the substrate 1 to be processed is brought into contact with and is separated from the heaters 2a and 2b, as pins 7 supporting the substrate 1 are elevated up and down. A straightening plate 9 is provided between the substrate 1 to be processed and the blackbodies 4 and the radiation thermometers 5. This straightening plate 9 is provided in order to prevent the atmosphere on the surface of the substrate 1 from being disturbed. By eliminating this turbulent flow of the atmosphere, the temperature of the photosensitive thin film formed on the substrate 1 is prevented from being changed. A hole of 10 mmφ is formed in the light axis direction in the straightening plate 9 so as not to prevent the light passage which infrared light passes, as shown in FIG. 1B. The straightening plate 9 can be driven in all directions of X, Y, and Z.

A transfer arm 8 serves to transfer the substrate 1 to be processed. By this transfer arm 8, the substrate 1 on the sample table 2 is conveyed onto the cooling plate 12 made of aluminum (Al). A drive control section 10 controls driving of the straightening plate 9, Z-direction driving of the heaters 2a and 2b, and driving of the transfer arm 8. A temperature adjustment unit 11 comprises a mechanism for spraying a temperature-adjusted gas (e.g., nitrogen or the like) onto the substrate 1 to be processed on the cooling plate 12. Note that the broken line 13 denoted at 13 in FIG. 1B is an outer frame of the apparatus. This outer frame 13 isolates the measurement system from outer turbulence so that turbulence or the like might not be caused in the flow of the atmosphere, to enable more precise temperature measurement.

Next, a heat treatment method using the heat treatment apparatus will be explained.

At first, a positive chemical amplification resist (having a photo resist film thickness of 500 nm) is applied onto a quarts substrate (mask blank) with a chrome film which has a diameter of 6 inches and a thickness of 0.25 inches (according to the standard 6025). Further, this mask is exposed with light by an electronic beam drawing device (50 kev, 8 $\mu C/cm^2$). A mask blank 1 thus processed is prepared.

In the heat treatment apparatus according to the present embodiment, two blackbodies 4 are used as a pair, in order to measure simultaneously two positions, one of which is near the center of the mask blank 1 and near a end portion of the mask blank 1. The temperatures of the black bodies 4 are maintained to be constant such that stable constant heat is radiated from the black body 4. The radiation rates of the black bodies 4 and the photosensitive thin film on the substrate 1 are previously measured. Since these blackbodies 4 are provided at positions mirror-symmetrical to the radiation thermometers 5, the radiation amount as a sum of the radiation amount from the surface of the mask blank 1 and the constant radiation amount from the blackbody 4 can be received by the radiation thermometer 5 while eliminating infrared noise from the direction from the mirror-symmetric position of the radiation thermometer 5. Further, a constant light receiving amount (radiation amount) from the blackbody 4 is subtracted from the received radiation amount thus summed, the radiation amount from the surface of the mask blank 1 can be detected with high preciseness. The blackbodies 4 are provided as shown in FIGS. 1A and 1B.

Next, the temperature of the blackbody 4 is set to 100° C. After the temperature of the blackbody 4 is stabled sufficiently, the blackbody 4 is positioned by a positioning unit. Thereafter, the mask blank 1 is transferred by the transfer arm 8 and positioned. At the same time, the straightening plate 9 is arranged at an optimized position (at a position by 5 mm above the mask blank 1). The temperature control section 3 is triggered such that temperature measurement by the radiation thermometer 5 is started at the instance when the mask blank 1 is set on the sample table 2. At this time, the measurement wavelength of the radiation thermometer 5 is set to 9 to 14 $\mu$m.

Figure 2:
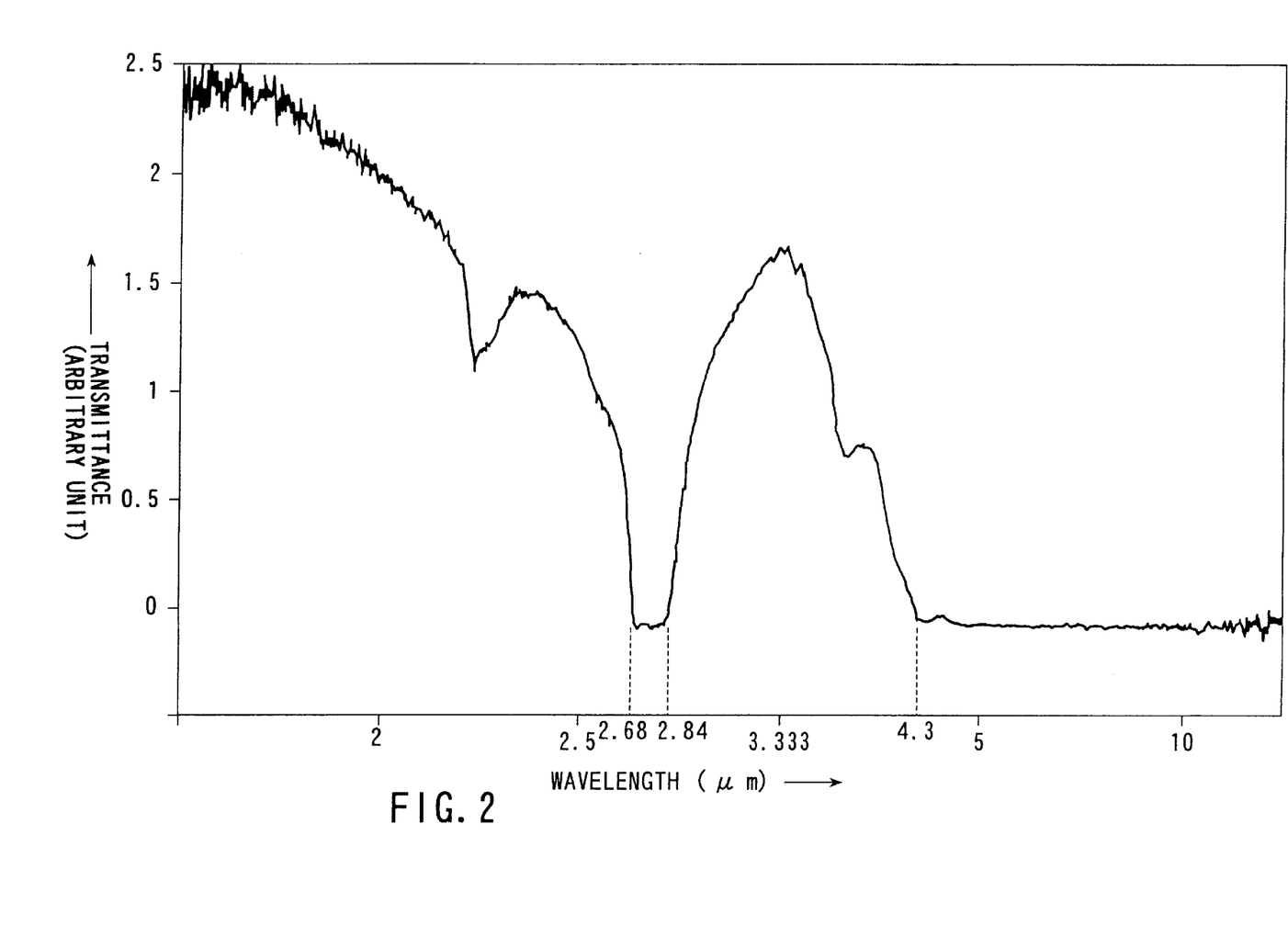
FIG. 2 is a graph showing the transmittance characteristic of a mask blank according to the first embodiment, with respect to an infrared beam.
Figure 3:
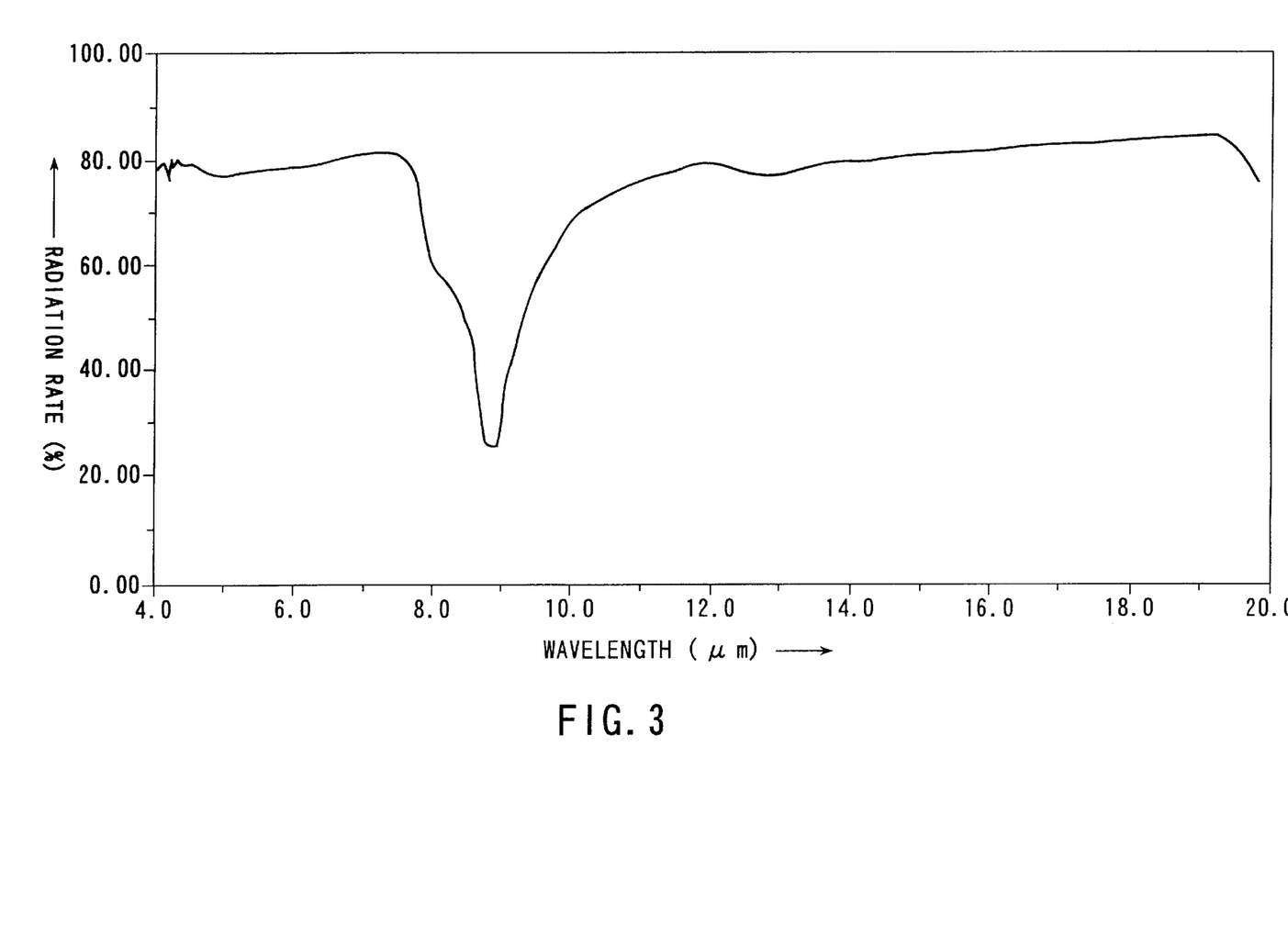
FIG. 3 is a graph showing radiation rate characteristic of a quartz substrate forming the mask blank.

The transmittance of the photomask blank 1 with a resist with respect to infrared light is substantially 0 where the wavelength is within a range of approximately 2.7 to 2.8 $\mu$m and a range of approximately 4.3 $\mu$m or more, as shown in FIG. 2. Therefore, measurement of the temperature of the substrate surface (the surface of the photosensitive material film on the substrate) in a quartz substrate on which a photosensitive material film is formed is enabled by selecting the wavelength ranges. Also, the radiation rate of the quartz becomes small within the wavelength range of 8 to 9 $\mu$m, as shown in FIG. 3. Hence, the range of 9 to 14 $\mu$m in the side of longer wavelength is used for temperature measurement by means of radiation thermometers 5, to avoid influences therefrom on measurement.

Figure 4A:
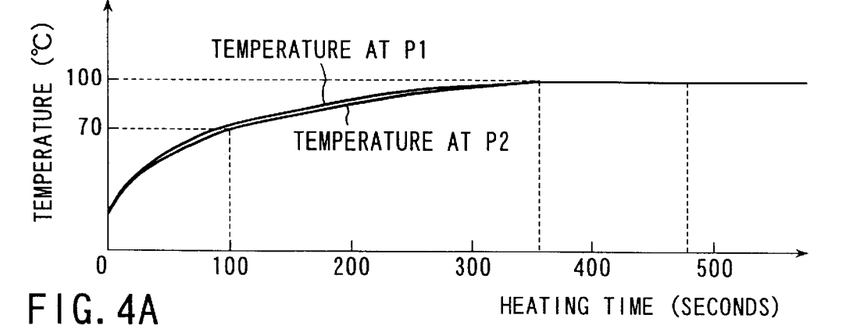
FIG. 4A is a graph showing the temperature history of the mask blank during heating in the first embodiment.

The mask blank 1 with a resist is set on the sample table 2 having heaters, and measurement is started. The temperature of the mask blank 1 rises, and the input powers to the heaters 2a and 2b are continuously controlled by a PID system until the temperature of the surface of the mask blank 1 is finally stabled at a predetermined temperature. FIG. 4A shows the temperature histories at the center portion P1 and peripheral portion P2 as measurement positions shown in FIG. 1A. The temperature of the surface of the mask blank 1 is stabled at 100° C. after about 360 seconds. The temperature histories at the center portion P1 and the peripheral portion P2 of the mask blank 1 are substantially equal to each other.

The temperature control section 3 determines the powers applied to the heaters 2a and 2b in response to the temperatures instructed by the radiation thermometers 5 and are feedback to the heaters 2a and 2b. Also, the temperature control section 3 continuously calculates and records the integrated value of the energy amount, in order that heating can be stopped when the energy amount calculated by integration of the surface temperature of the mask blank 1 with respect to the heat treatment time reaches a preset value.

In the present embodiment, the surface temperature of the mask blank (substrate to be processed) 1 becomes constant at a preset temperature, and heating is further continued for 120 seconds and then stopped. The total baking time was 480 seconds. Thereafter, the pins 7 and the straightening plate 9 are elevated up, and thereafter, the mask blank 1 and the heaters 2a and 2b are isolated from each other. Further, positioning of the mask blank 1 is carried out, and thereafter, the mask blank 1 is moved onto the cooling plate 12.

Next, the step of cooling the mask blank (substrate to be processed) 1 will be explained below. The temperature adjust unit 11 shown in FIG. 1B serves to adjust the temperature and flow rate of a gas used for cooling the mask blank 1. This temperature adjust unit 11 adjusts the temperature and flow rate of the gas in correspondence with the position of the mask blank 1, in accordance with an instruction from the temperature control section 3, and lets the gas flow from above the mask blank 1. Cooling of the mask blank 1 is carried out by making a gas (e.g., pure-$N_2$) whose temperature is adjusted flow from above the mask blank 1 and uniformly spraying the gas onto the entire surface of the mask blank 1.

At first, the straightening plate 9 is arranged at an optimized position (which is 5 mm above the mask blank 1) after completion of setting of the mask blank 1. The temperature of the blackbodies 4 is set to 70° C. Further, the blackbodies 4 and the radiation thermometers 5 are moved by a stage, and are arranged at optically mirror-symmetrical positions with respect to the surface of the mask blank 1. In this manner, the radiation thermometers 5 are arranged at positions where arbitrary measurement positions on the surface of the mask blank 1 can be monitored. Further, cooling of the mask blank 1 is started, and temperature measurement is started by the radiation thermometers 5.

Figure 4B:
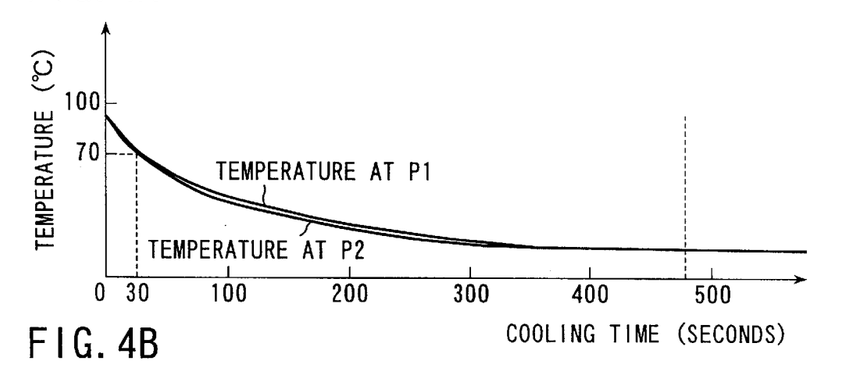
FIG. 4B is a graph showing the temperature history of the mask blank during cooling in the first embodiment.

After starting the cooling, temperature measurement is carried out at two positions at the center portion P1 and peripheral portion P2 of the mask blank 1, for every second. The temperature control section 3 determines such a temperature of the gas that equalizes the temperatures at the center portion P1 and the peripheral portion P2 and cools the mask blank most rapidly. The temperature adjust unit 11 adjusts the gas to the determined temperature and makes it flow, in accordance with an instruction from the temperature control section 3. FIG. 4B shows the histories of the temperatures at the center portion P1 and the peripheral portion P2 of the mask blank 1 in this cooling step. As a result of measuring after 30 seconds from the starting of the cooling, the temperature of the center portion P1 of the mask blank 1 was 70.0° C.

The temperature control section 3 determines the temperature of the gas in response to the temperatures instructed by the radiation thermometers 5, and issues an instruction to the temperature adjust unit 11. The gas temperature instructed at this time by the temperature control section 3 was 4.0° C. at the center portion of the mask blank 1 and was 9.6° C. at the peripheral portion of the mask blank 1. Cooling of the mask blank 1 was continued on the cooling plate until a room temperature is obtained. From FIG. 4B, it is found that the temperature difference between the center portion P1 and the peripheral portion P2 of the photosensitive thin film on the mask blank 1 is within a very small range (about 0.2° C.).

After completion of the cooling, the resist of the mask blank 1 is subjected to dip-development, to dry-etch chrome. After peeling the resist, the mask blank 1 is washed. Thus, manufacture of a photomask is completed. Thereafter, in-plane uniformity of the dimensions of line/space patterns formed in the surface of the photomask was evaluated by SEM. As a result, there was no substantial difference from designed dimensions but patterns with very high preciseness could be obtained.

Thus, in the present embodiment, temperature measurement of non-contact type using blackbodies and radiation thermometers is adopted in the step of preparing a photomask used in steps of manufacturing a semiconductor device. According to a conventional method, in a system in which the mask blank is heated from downside, it is very difficult to manage the temperature of the resist film on the quartz substrate since a thermocouple and a resistance bulb used for performing temperature control are embedded near the surface of the heat plat. The heat capacity of the quartz substrate is very large and the heat conductivity thereof is very low, so the history of temperature increase differs between the center portion and the peripheral portion of the substrate. A problem has hence arisen in that the pattern dimensions differ in one same plane of the substrate.

In contrast, according to the present embodiment, the wavelength to be measured by the radiation thermometers 5 of non-contact type is limited (to 9 to 14 μm in the case of the present embodiment) in measurement of the temperature of the photo resist film existing on the mask blank, and blackbodies 4 are arranged at positions mirror-symmetrical to the positions of the radiation thermometers 5 with respect to the photo resist film, based on the mirror characteristic of the photo resist film. The radiation thermometer therefore receives two radiation lights, i.e., radiation light from the surface (the photosensitive thin film and the thin film containing metal) of the substrate to be processed and radiation light which comes from the black body and is reflected on the surface of the substrate. By previously measuring radiation rates of the black body and the photosensitive thin film on the substrate to be processed, it is possible to know the radiation amount which enters into the radiation thermometer from the black body. Therefore, as for the radiation from the surface of the substrate, mixture of stray light can be efficiently prevented if the radiation amount which comes from the black body and is reflected on the surface of the substrate is subtracted from the radiation amount which is actually received by the radiation thermometer. As a result, stray light entering into the thermometers 5 can be shielded, and the temperature of the photo resist film can be measured with very high preciseness of an range of 10.2 degrees.

Further, the substrate surface temperature above the heater 2a provided near the center of the substrate differs from the substrate surface temperature above heater 2b provided near an end portion of the substrate. With respect to the problem that the heat history differs in the plane of this substrate, feedback control is effected by the control section so as to equalize both temperatures, and an instruction is generated so as to increase the output of the heater 2b. As a result, the total decomposition reaction amount of the dissolution inhibiting group in the resist during the heating processing becomes substantially equal between the portion near the center and the portion near the end portion. In this manner, significant improvements ware made in concentrically circular distribution of dimensions which is considered to be caused by concentrically circular distribution of heats. Note that 3σ=10 nm was achieved in case of a substrate of 130-mm square having a diameter of 6 inches and a thickness of 0.25 inches (according to standard 6025).

Also, the total energy amount applied to the substrate during heating can be controlled strictly. Therefore, controllability of absolute dimensions in the substrate was greatly improved. Where ten masks were experimentally prepared by similar processing according to the present embodiment, all differences (mean-target) from designed dimensions could be controlled within a range of ±10 nm. From the reasons described above, a photomask with high preciseness can be manufactured by the present embodiment.

In the present embodiment, the temperature can be measured with high preciseness over a wide range by providing a plurality of blackbodies. However, it is possible to substitute the blackbodies with one single blackbody. Although the present embodiment uses blackbodies and a radiation thermometer to maintain measurement preciseness of the temperature in the plane of the substrate, the temperature distribution over the entire surface of the substrate can be measured with one single blackbody 4 and one single radiation thermometer 5 by appropriately selecting the sizes of the blackbody 4 and the radiation thermometer 5 and the layout thereof (incidence angles to the substrate).

Figures 5A, 5B, 5C:
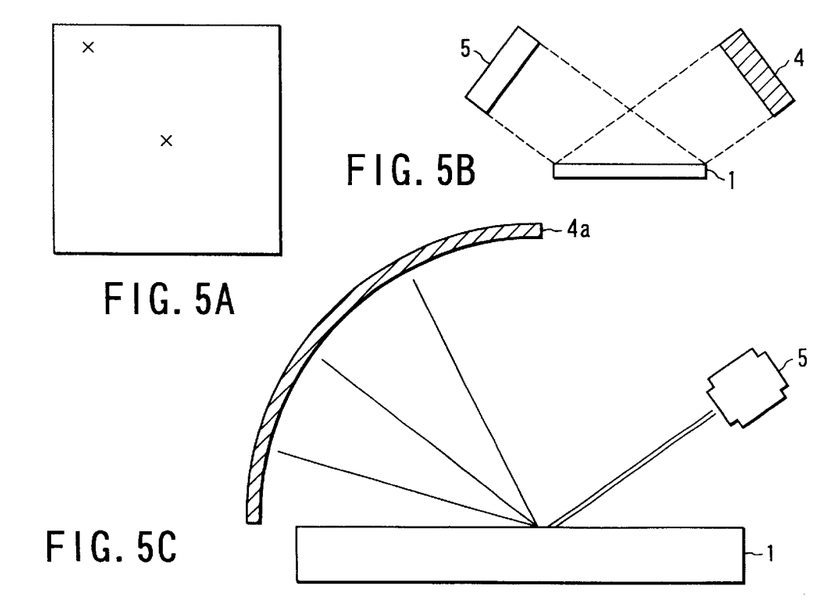
FIG. 5A is a plan view showing representative position coordinates at which temperature measurement of the substrate surface is carried out.
FIG. 5B is a side view showing a layout example of a blackbody and a radiation thermometer with respect to the substrate.
FIG. 5C is a side view showing another layout example of a blackbody and a radiation thermometer with respect to the substrate.

In addition, feedback to the divided heaters 2a and 2b can be achieved, by determining representative positional coordinates with respect to the area monitored by the radiation thermometer 5, by inputting the representative positional coordinates and the temperature thereof to the temperature control section 3, and by further adjusting the relationship between the representative coordinates and the positions of the heaters. FIG. 5A is a plan view of the substrate to be processed based on the radiation thermometer 5, and the mark × in the figure indicates representative coordinates.

Also, in the present embodiment, an infrared beam used for temperature measurement is mirror-reflected by a flat substrate. Therefore, stray light needs only be shielded with respect to the size determined by considering only the mirror reflection from the substrate surface. However, in case of a substrate which already includes a pattern and the like and which causes irregular reflection, a structure using a much larger blackbody 4a is more effective, as shown in FIG. 5C.

In the present embodiment, the temperature control of a medium in the cooling step has been described. However, needless to say, similar temperature control can be made in the heating step. In addition, the medium used for temperature control is not limited to nitrogen, but another inactive gas such as Ar, Ne, He, or the like can be used. Also, the medium is not limited to a gas but a liquid such as water or fluorinate may be used.

[Second Embodiment]

Figure 6:
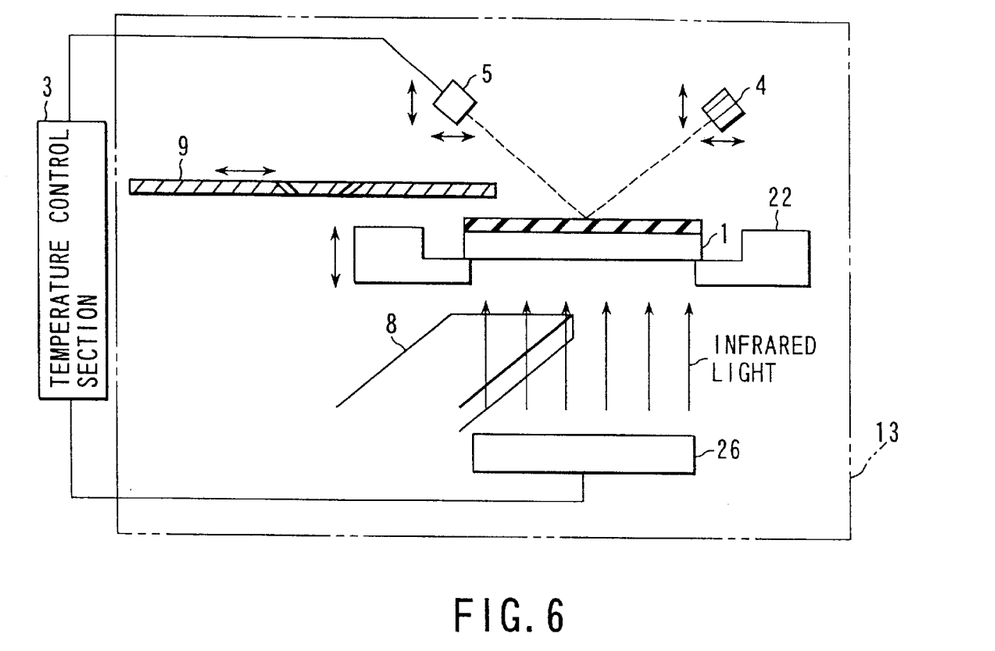
FIG. 6 is a side view showing the structure of the heat treatment apparatus according to the second embodiment of the present invention.

FIG. 6 is a side view schematically showing the structure of a heat treatment apparatus according to the second embodiment of the present invention. Note that the same portions as those in FIG. 1 are denoted at same reference symbols and detailed explanation thereof will be omitted herefrom.

In the present heat treatment apparatus, no heater is provided for the sample table 22, and a halogen lamp 26 is provided as a heating source of the substrate 1 to be processed in the back surface side of the substrate (i.e., in the side of the surface opposite to the surface where a target film is formed). Used herein is a halogen lamp 26 having a peak wavelength of about 1.1 $\mu$m. Other respects of the structure including the temperature control section 3, blackbody 4, radiation thermometer 5, transfer arm 8, straightening plate 9, and the like are substantially the same as those in the first embodiment.

At first, a positive chemical amplification resist (having a photo resist film thickness of 500 nm) is applied onto a photomask blank of 6 inches as the substrate 1 to be processed. Further, this mask blank is exposed with light by an electronic beam drawing device (50 keV, 15 gC/cm$^2$). A mask blank 1 thus processed is prepared.

Next, heating is performed on the mask blank 1 (substrate to be processed) 1. This heating processing means PEB processing of the mask substrate which is carried out after drawing.

As shown in FIG. 6, a halogen lamp 26 is provided below the substrate to be processed 1. Above the substrate 1, one blackbody 4 and one radiation thermometer 5 are provided so as to make a positional mirror relationship with each other with respect to the surface of the substrate 1. The temperature of the blackbody 4 is set to 100° C. and is stabled at this temperature. In this while, alignment is carried out with respect to the positions of the straightening plate 9, blackbody 4, and radiation temperature 5. These positions are adjusted by a stage which can be adjusted in the directions of X, Y, Z, θ, and φ, such that the measurement sensitivity is maximized. After the temperature of the blackbody 4 is stabled, the substrate 1 is set on the sample table 22 by the transfer arm 8.

Figure 7:
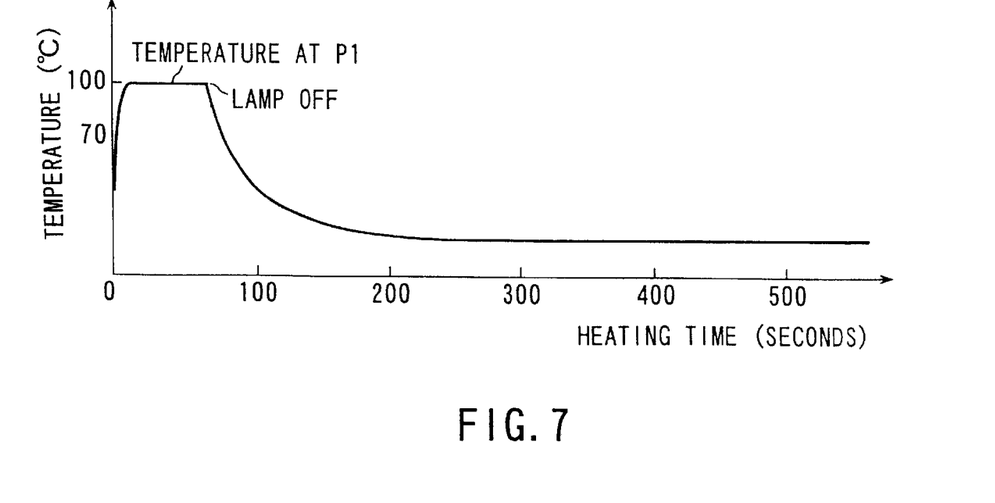
FIG. 7 is a graph showing the temperature history of a mask blank during heating in the second embodiment.

The halogen lamp 26 is turned on and heating of the substrate 1 is started. At the same time, measurement of the temperature is started by the radiation thermometer 5. The measurement wavelength of the radiation thermometer 5 is set to 9 to 14 $\mu$m with which radiation from quarts and radiation from the halogen lamp 26 are cut by the chrome layer as a shielding film. This is performed in order to improve the SN ratio as much as possible although the peak wavelength of the halogen lamp 26 is 1.1 $\mu$m and the halogen lamp 26 does not substantially radiate light having a wavelength of 9 to 14 $\mu$m. FIG. 7 shows a situation in which the substrate 1 is heated and the temperature of the center portion P1 of the substrate 1 increases.

In this manner, ten seconds after, the surface temperature of the substrate 1 reached 100° C. as the set temperature. Thereafter, the voltage applied to the lamp 26 is controlled such that the surface temperature of the substrate 1 to be processed is maintained at 100° C. by the temperature control section 3, and heating is performed for the time for which energy is applied by the energy threshold value calculated by integration of the preset substrate surface temperature with respect to the heat treatment time, i.e., heating is performed for 60 seconds. Thereafter, the power of the lamp 26 is turned off to stop heating. Several seconds after, the surface temperature of the quartz substrate 1 returns to the temperature at which a decomposition reaction of the dissolution inhibiting group is not caused by PEB of the chemical amplification resist. Therefore, cooling control processing was determined as being unnecessary for the substrate 1 to be processed, and was therefore not carried out.

Thereafter, the resist on the substrate 1 to be processed was subjected to dip-development, and dry etching was performed on chrome. Thus, manufacture of a photomask was terminated. Thereafter, in-plane uniformity of dimensions of line/space patterns formed in the plane of the photomask was evaluated by dimension SEM. As a result, there were no substantial differences from designed dimensions, so patterns could be obtained with very high preciseness.

Thus, according to the present embodiment, blackbody radiation and temperature measurement using a radiation thermometer are applied to a step of preparing a photomask used in a step of manufacturing a semiconductor device. According to a conventional method, radiation light directly used for heating, radiation light from quartz, and stray light existing in the direction toward the mirror image with respect to the temperature measurement position on the photo resist film become measurement noise when measuring the temperature of the photo resist film in case where a lamp (radiation) is used as a heating means.

In contrast, according to the present embodiment, the radiation thermometer 5 does not detect radiation light from radiation sources existing in the side opposite to the shielding film (chrome film) layer since the temperature monitor wavelength of the radiation thermometer 5 is set at 9 to 14 μm. Therefore, the temperature of the photo resist film can be measured with high preciseness by the radiation thermometer 5.

In addition, the surface of the photo resist film has very high flatness and therefore has a mirror characteristic. Therefore, there is provided a mechanism (which is the blackbody 4 having a constant temperature in the present embodiment) which removes stray light in the direction in which the position of the mirror image of the radiation thermometer 5 exists, with respect to the temperature measurement positions as reference positions. The radiation thermometer therefore receives two radiation lights, i.e., radiation light from the surface (the photosensitive thin film and the thin film containing metal) of the substrate to be processed and radiation light which comes from the black body and is reflected on the surface of the substrate. By previously measuring radiation rates of the black body and the photosensitive thin film on the substrate to be processed, it is possible to know the radiation amount which enters into the radiation thermometer from the black body. Therefore, as for the radiation from the surface of the substrate, mixture of stray light can be efficiently prevented if the radiation amount which comes from the black body and is reflected on the surface of the substrate is subtracted from the radiation amount which is actually received by the radiation thermometer. As a result, mixture of the stray light into the radiation thermometer 5 can be prevented efficiently, and the temperature of the photo resist film can be measured with high preciseness by the radiation thermometer 5.

Also, in infrared heating with use of a halogen lamp, the temperature increase of the quartz substrate can be greatly reduced. Therefore, the step of cooling the substrate 1 can be removed depending on the processing time. Accordingly, it is possible to improve greatly the problem that the dimensions reflect the temperature distribution during baking due to the size of heat capacity of the quartz substrate and the low heat conductivity in case of using a heating means based on a conventional heater. Further, the surface temperature can be monitored with very high preciseness, by using the temperature measurement method according to the method described in the present embodiment in which the blackbody 4 and the radiation thermometer 5 are combined with each other. As a result of this, the dimension controlability in the PEB step can be remarkably improved, and the concentrically circular distribution of dimensions which is considered as being caused by the temperature distribution in the plane of the mask during the PEB can be improved greatly. 3σ=11 nm was achieved with a substrate of 130-mm square according to the standard 6025.

Also, the total energy amount applied to the substrate during heating can be controlled strictly. Therefore, the controllability of the absolute dimensions in the plane of the substrate was improved remarkably. Where ten masks were experimentally prepared by similar processing in the present embodiment, differences (mean-target) from designed dimensions were all controlled within ±10 nm. From the reasons described above, a photomask with very high preciseness can be manufactured according to the present embodiment.

In the present embodiment, noise light which enters into the radiation thermometer 5 is shielded and removed by using the mirror layout of the blackbody 4 and infrared characteristics of the photomask blank. Taken into consideration that the response speed of the radiation thermometer 5 is about 0.5 seconds, the temperature management can be performed by making correction in a software-based manner in which, for example, the temperature is measured immediately after turning off or decreasing the power applied to the lamp 26 and an offset value is then added, etc. That is, the infrared light noise is more reduced and measurement is performed by reducing the power applied to the infrared lamp 26 to zero or a very small value at the instance of temperature measurement.

[Third Embodiment]

Figure 8:
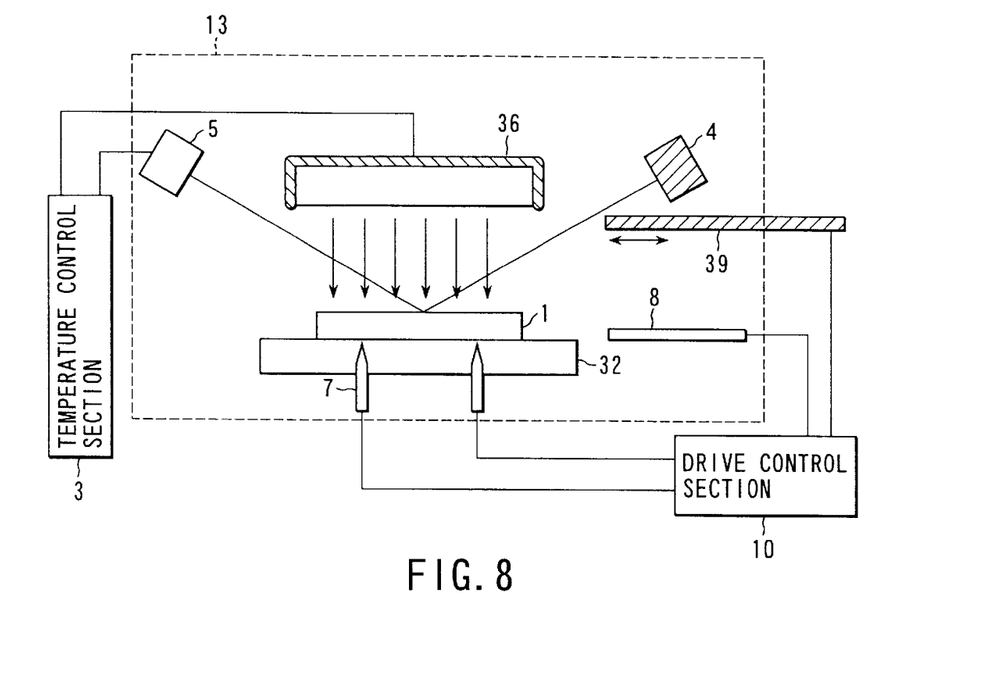
FIG. 8 is a side view showing the structure of the heat treatment apparatus according to the third embodiment of the present invention.

FIG. 8 is a side view showing the schematic structure of a heat treatment apparatus according to the third embodiment of the present invention. Note that the same portions as those in FIG. 1 are denoted at same reference symbols and detailed explanation thereof will be omitted herefrom.

In the present treatment apparatus, the sample table 32 is not provided with a heater and a halogen lamp 36 is provided, as a heating source for the substrate 1 to be processed, in the surface side (the surface side where a film as a target is formed) of the substrate. Used herein is a halogen lamp 36 having a peak wavelength of about 1.1 μm. Further, a shielding plate 39 is provided between the substrate 1 to be processed and the lamp 36. This shielding plate 39 serves to shield infrared beams at the rising (preheating) and trailing (end of heating) of the heating of the lamp. The other respects of the structure including the temperature control section 3, blackbody 4, radiation thermometer 5, pins 7, transfer arm 8, and the like are substantially the same as those of the first embodiment.

At first, a positive chemical amplification resist (having a photo resist film thickness of 500 nm) is applied onto a photomask blank of 6 inches as the substrate 1 to be processed. Further, this mask blank is exposed with light by an electronic beam drawing device (50 keV, 5 μC/cm$^2$). A mask blank 1 thus processed is prepared.

Next, heating processing is performed on the mask blank 1 (substrate to be processed) 1. This heating processing means PEB processing of the mask substrate which is carried out after drawing.

As shown in FIG. 8, a halogen lamp 36 is provided above the substrate to be processed 1. Also above the substrate 1, one blackbody 4 and one radiation thermometer 5 are provided so as to make a mirror positional relationship with each other with respect to the surface of the substrate 1, as shown in FIG. 8. The temperature of the blackbody 4 is set to 100° C. and is also stabled at this temperature. In this while, alignment is carried out with respect to the positions of the blackbody 4 and the radiation temperature 5. These positions are adjusted by a stage which can be adjusted in the directions of X, Y, Z, θ, and φ, such that the measurement sensitivity is maximized. After the temperature of the blackbody 4 is stabled, the substrate 1 is set on the sample table 32 by the transfer arm 8.

The halogen lamp 36 is turned on and heating of the substrate 1 is started. At the same time, measurement of the temperature is started by the radiation thermometer 5. At this time, rectangular wave modulation at a frequency of 1 Hz with the maximum applied power of 600 W and the minimum applied power of 20 W is applied to the power applied to the lamp 36. Further, the temperature control section 3 is triggered such that the monitoring cycle of the radiation thermometer 5 is synchronized with the modulation frequency. Measurement by the radiation temperature 5 is set so as to be carried out when the power applied to the lamp 36 is minimum (20 W). The measurement wavelength of the radiation thermometer 5 is set to 9 to 14 μm like in the first and second embodiments.

Figure 9:
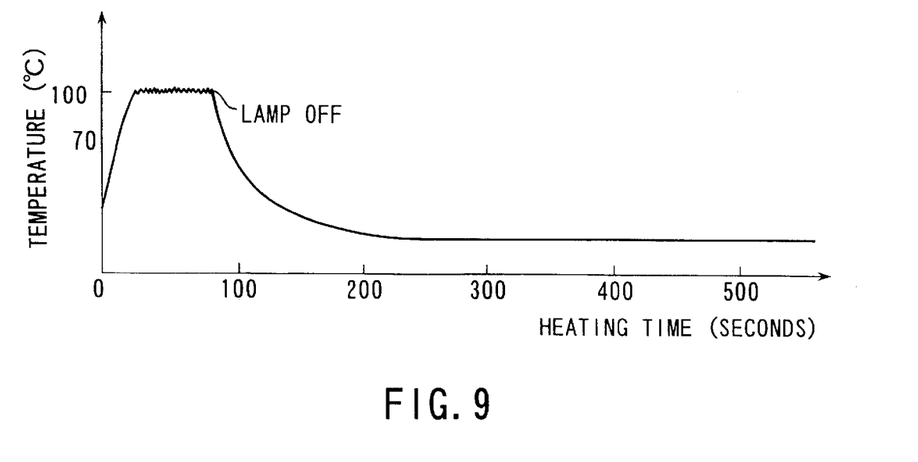
FIG. 9 is a graph showing the temperature history of a mask blank during heating in the third embodiment.

Rectangular wave modulation is thus applied to the lamp power regardless of the measurement wavelength of the temperature set to 9 to 14 μm. This is because the photo resist film and the chrome film have a very small radiation rate of about 0.2 to 0.25 so that the radiation intensity is very weak, and the SN ratio must be improved. FIG. 9 shows the process in which the substrate 1 to be processed is heated and the temperature increases. The curve of the temperature is indicated by a notched line because temperature measurement was carried out in synchronization with the modulation frequency.

In this manner, thirty seconds after, the surface temperature of the substrate 1 reached 100° C. as the set temperature. Thereafter, the voltage applied to the lamp 36 is controlled such that the surface temperature of the substrate 1 to be processed is maintained at 100° C. by the temperature control section 3, and heating is performed for further 60 seconds from the energy threshold value set by the temperature control section 3. Thereafter, the power of the lamp 36 is turned off to stop heating. Since the quartz substrate does not almost warm yet, the surface temperature of the quartz substrate 1 returns to the temperature at which a decomposition reaction of the dissolution inhibiting group is not caused by PEB of the chemical amplification resist, in several seconds after the instance when the voltage of the lamp 36 is decreased. Therefore, cooling control processing was determined as being unnecessary for the substrate 1 to be processed, and was therefore not carried out particularly.

Thereafter, the resist on the substrate 1 to be processed is subjected to dip-development, and dry etching is performed on chrome. Thus, manufacture of a photomask was completed. Thereafter, in-plane uniformity of dimensions of line/space patterns formed in the plane of the photomask was evaluated by dimension SEM. As a result, there were no substantial differences from designed dimensions, so patterns could be obtained with very high preciseness.

Thus, according to the present embodiment, temperature, blackbody radiation and temperature measurement using a radiation thermometer are applied to a step of preparing a photomask used in a step of manufacturing a semiconductor device. According to a conventional method, in case where a lamp (radiating section) is used as a heating means and the lamp is provided above the quartz substrate, it is considered that radiation noise to the radiation thermometer may occur.

In contrast, according to the present embodiment, radiation noise can be reduced by removing or reducing radiation due to heating only during temperature measurement, so that accurate temperature measurement is enabled. In addition, if the peak wavelength of the halogen lamp 36 is set to a near-infrared-radiation range, the light of 9 to 14 μm used as the measurement wavelength in the present embodiment is very small. Therefore, if modulation is not effected on the radiation, temperature measurement can be achieved in some cases. Accordingly, the surface temperature can be monitored with very high preciseness, by using the temperature measurement method according to the method described in the present embodiment in which the black body 4 and the radiation thermometer 5 are combined with each other. As a result of this, the dimension controlability in the PEB step can be remarkably improved, and the concentrically circular distribution of dimensions which is considered as being caused by the temperature distribution in the plane of the mask during the PEB can be improved greatly. 3σ=11 nm was achieved with a substrate of 130-mm square according to the standard 6025.

Also, the total energy amount applied to the substrate during heating can be controlled strictly. Therefore, the controllability of the absolute dimensions in the plane of the substrate was improved remarkably. Where ten masks were experimentally prepared by similar processing in the present embodiment, differences (mean-target) from designed dimensions were all controlled within ±10 nm. From the reasons described above, a photomask with very high preciseness can be manufactured according to the present embodiment.

[Fourth Embodiment]

Figure 10A:
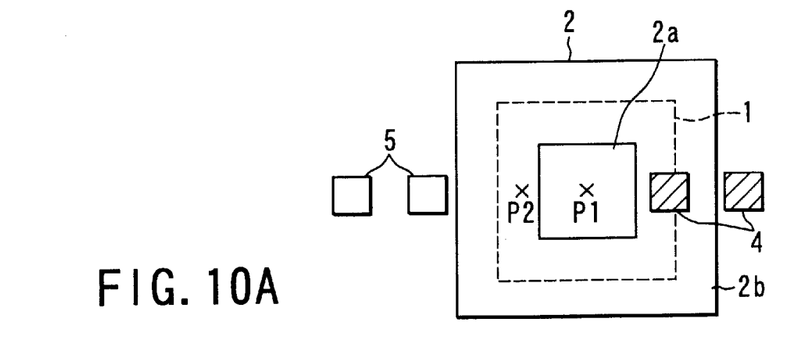
FIG. 10A is a plan view showing a part of the structure of a heat treatment apparatus according to the fourth embodiment of the present invention.
Figure 10B:
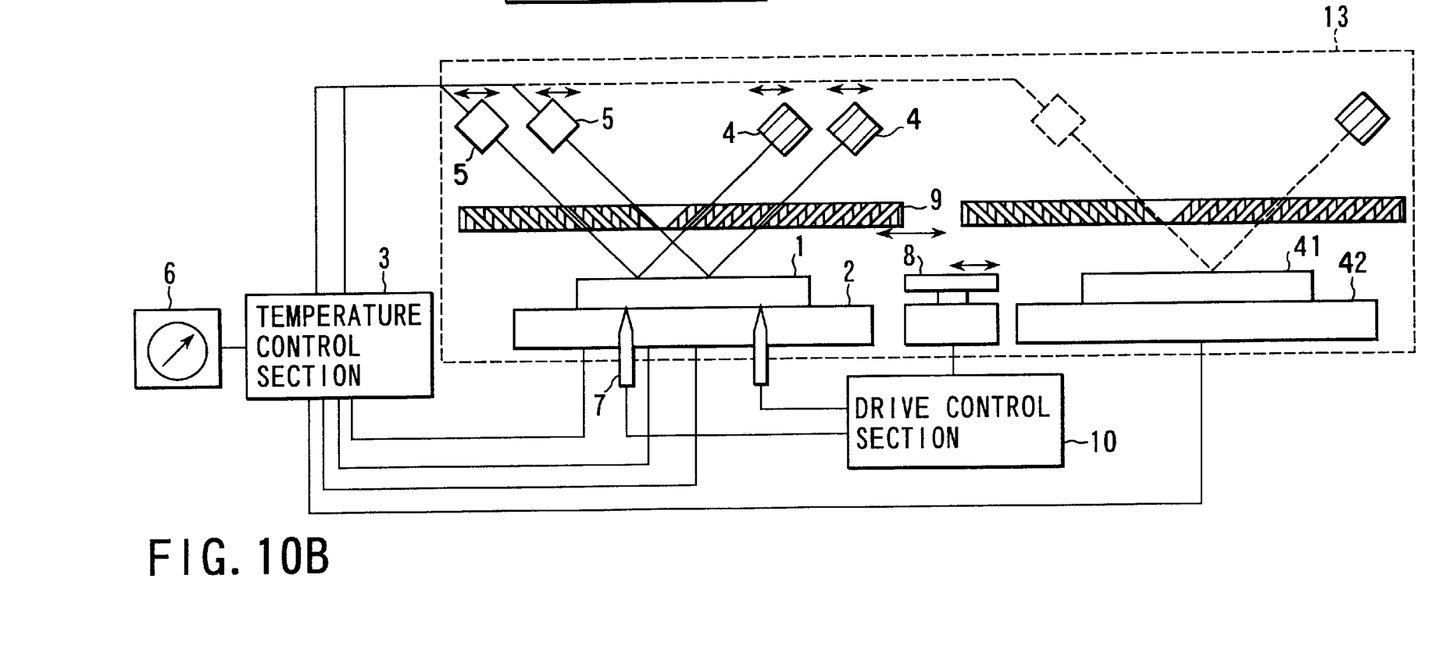
FIG. 10B is a side view showing the structure of the heat treatment apparatus according to the fourth embodiment of the present invention.

FIG. 10B is a side view showing the schematic structure of a heat treatment apparatus according to the fourth embodiment of the present invention. Note that the same portions as those in FIG. 1 are denoted at same reference symbols and detailed explanation thereof will be omitted herefrom.

The present treatment apparatus is constructed by adding the following two equipments or measures to the apparatus shown in the first embodiment. As shown in FIGS. 10A and 10B, a reference sample 41 is set on a heater 42. There reference sample 41 is a substrate to be processed for correcting the temperature of the radiation thermometer 5 and also is a chrome mask blank with a resist, which has the same radiation rate as the substrate 1 to be processed, shown in the figure. The heater 42 heats the reference sample 41 under control by the temperature control section 3.

As for the reference sample 41, a thermocouple is embedded in the chrome film so that the temperature near its surface can be measured. A lead line from the thermocouple is processed so as not to be exposed from the surface. The power applied to the heater 42 is controlled by the temperature control section 3 so that the temperature of the thermocouple is continuously maintained at a temperature at which the mask blank after exposure is subjected to PEB. In this case, the temperature is set to 100° C.

It is most preferable that the reference sample 41 has the same structure as the substrate 1 to be processed, i.e., a chrome film is formed on the quartz substrate and a photo resist film is applied thereon. However, the reference sample 41 is not limited hitherto as long as the reference sample has a structure substantially equal to that of the substrate 1 and provides a radiation rate substantially equal to that of the substrate 1. For example, only polymer as a main component of the resist may be formed in place of the photo resist film.

Before the mask blank after exposure is subjected to PEB in the first embodiment, the method described below is used to correct the measurement error (which particularly has a long cycle (drifting of the sensitivity)) caused by the radiation thermometer (infrared sensor) 5. Before the substrate 1 to be processed is subjected to a heat treatment, the temperature of the reference sample 41 is firstly set to a constant temperature (100° C.). Further, the infrared sensor 5 and a corresponding blackbody 4, which are used for actually measuring the temperature of the surface of the substrate 1, are moved to points at which the temperature at one point on the reference sample 41 can be measured, with use of a movable stage. At this time, the thermocouple indicates a temperature of 100.0° C., and the infrared sensor 5 indicates a temperature of 100.0° C., where the radiation rate of the resist is $\epsilon=0.25$. Thereafter, in order to be processed which has been exposed with an electron beam, the infrared sensor 5 and the blackbody 4 are returned to positions at which the temperature of the substrate 1 to be processed on the sample table 2 can be measured to perform a heat treatment on the substrate 1.

Subsequently, the substrate 1 to be processed is transferred and mounted onto the sample table 1 by the transfer arm 8. At the same time, the straitening plate 9 is arranged at an optimized position (5 mm above the substrate). Further, heating processing and cooling processing are performed on the substrate 1 to be processed, like in the first embodiment.

One hour after the heat treatment, if it is necessary that another mask blank after exposure should be subjected to PEB, the following method is used. Before the substrate 1 to be processed is subjected to a heat treatment, the temperature of the reference sample 41 is set to a constant temperature (100° C.). Further, the infrared sensor 5 and the corresponding blackbody 4 are moved again to points at which the temperature at one point on the reference sample 41 can be measured, with use of the movable stage, and measurement is carried out. At this time, the thermocouple of the reference sample 41 indicates a temperature of 100.0° C., and the infrared sensor 5 indicates a temperature of 102.4° C., where the radiation rate of the resist is $\epsilon=0.25$.

Although the measurement temperatures of the reference sample 41 indicated by the thermocouple for the first and second times are equal to each other, the temperature indicated by the infrared sensor 5 differ from each other. In this case, this error is considered to be caused by sensitivity drifting of the infrared sensor 5 and the gain of the infrared sensor 5 is adjusted so that the output of 102.4° C. becomes 100° C. Subsequently, the infrared sensor 5 and the corresponding blackbody 4 are returned to positions where temperature measurement of the substrate 1 after exposure can be carried out. Further, a heat treatment is performed on the substrate 1 to be processed, on the sample table 2, and thereafter, cooling processing is performed thereon.

The resist on the substrate which was first subjected to a heat treatment is subjected to dip-development, and dry etching is performed on chrome. After peeling the resist, the substrate is washed. Likewise, the resist on the substrate which was second subjected to a heat treatment is subjected to dip-development, and dry etching is performed on chrome. After peeling the resist, the substrate is washed. Thus, manufacture of first and second photomasks are completed. Thereafter, in-plane uniformity of the dimensions of line/space patterns formed in the surface of each photomask was evaluated by SEM. As a result, there was no substantial differences from designed dimensions with respect to both the first and second photomasks, but patterns with very high preciseness could be obtained.

Thus, according to the present embodiment, the temperature of the reference sample 41 is measured with use of a blackbody and a radiation thermometer 5 which are used for measurement, before the substrate 1 to be processed is subjected to heating processing. After temperature correction is then made to the radiation thermometer 5, the temperature of the substrate 1 is measured. In this manner, most of influences from the temperature drifting of the radiation thermometer 5 can be successfully eliminated. As a result of this, the dimension controllability during PEB is remarkably improved, and a plurality of photomasks could be experimentally manufactured with very high preciseness so that the dimension errors between the samples each other were within a range of ±4 nm.

Note that the present invention is not limited to the embodiments described above. The transparent substrate which forms the mask blank as the substrate to be processed is not limited to quartz as long as the substrate transmits light used for exposure. Likewise, the thin film contain metal as the mask blank is not limited to chrome as long as the film is a shielding film which shields light used for exposure. Further, the photosensitive thin film is not limited to the chemical amplification type resist but may be appropriately changed in accordance with specifications. In addition, the substrate to be processed is not limited to the mask blank but any substrate is applicable as long as a photosensitive thin film is formed on the substrate.

The measurement wavelength in the radiation thermometer is not limited to 9 to 13 $\mu$m as long as the measurement wavelength is within a range of 2.7 to 2.8 $\mu$m or 4.3 $\mu$m or more. However, in order to avoid securely reflection in case of quartz and influences from moisture absorption spectrums, the wavelength is desirably 9 to 14 $\mu$m or more. In addition, the present invention can be variously modified and practiced without deviating from the scope of the invention.

As has been specifically described, according to the present invention, the measurement wavelength of the radiation thermometer is set within a range of 2.7 to 2.8 $\mu$m or at 4.3 or more when the temperature of the surface of the substrate to be processed is measured in a non-contact manner by a radiation thermometer, in a heat treatment method and a heat treatment apparatus by which the substrate to be processed such as a substrate for exposure on which a photosensitive thin film is formed is heated to a desired temperature. Also, there is provided a mechanism for shielding stray light in the direction toward a mirror image of the radiation thermometer with respect to the temperature measurement position on the photosensitive film. In this manner, it is possible to prevent measurement errors from being caused by other radiated light than that from the object to be measured, and it is possible to measure accurately the surface temperature of the substrate to be processed. Further, temperature measurement is carried out while monitoring the surface temperature of the actual substrate to be processed (in-situ), and the measurement results can be instantaneously feedback to the heating control section. Thus, accurate temperature management of the substrate to be processed is enabled.

Also, before the heating processing on the substrate to be processed, the temperature of a reference sample, which is made of the same material as the substrate to be processed and set to a desired temperature, is measured by a radiation thermometer or a thermocouple for temperature correction embedded in a reference sample. Based on the data obtained from the measurement, correction is made to the measurement value of the radiation thermometer. As a result of this, influences from drifting of the radiation thermometer are eliminated, so that dimension errors among a plurality of substrates to be processed can reduced to be very small.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A heat treatment method comprising steps of:

measuring a temperature of a thin film formed on a metal film on a quartz substrate by a radiation thermometer using light whose wavelength range is 4.3 $\mu$m or more; and controlling a heated temperature of the thin film in response to the measured temperature of the thin film.

2. A method according to claim 1, wherein the step of measuring the temperature of the thin film is carried out in an environment in which a blackbody for cutting off noise light, which is reflected by the thin film and enters into the radiation thermometer, is provided.

3. A method according to claim 2, wherein the blackbody is provided at a position optically symmetrical to the radiation thermometer with respect to a surface of the thin film.

4. A method according to claim 1, further comprising, before the step of measuring the temperature of the thin film, steps of:

measuring a surface temperature of a reference sample which is made of same material as the substrate and is set at a target temperature, by the radiation thermometer; and correcting a measurement value of the radiation thermometer, based on temperature data obtained by the step of measuring the surface temperature of the reference sample.

5. A method according to claim 1, wherein the metal film is chrome.

6. A method according to claim 5, wherein the thin film is a photosensitive thin film.

7. A method according to claim 1, wherein the radiation thermometer is an infrared sensor.

8. An apparatus according to claim 1, wherein the heating section is provided in a side of a surface of the substrate which is opposite to another surface of the substrate where the thin film is formed.

9. An apparatus according to claim 8, wherein the heating section is a halogen lamp.

* * * * *